United States Patent [19]
Smith

[11] Patent Number: 5,821,659
[45] Date of Patent: Oct. 13, 1998

[54] HOMOPOLAR TRANSFORMER FOR CONVERSION OF ELECTRICAL ENERGY

[75] Inventor: Robert C. Smith, Annapolis, Md.

[73] Assignee: The United States of America as represented by the Secretary of the Navy, Washington, D.C.

[21] Appl. No.: 911,270

[22] Filed: Aug. 14, 1997

[51] Int. Cl.$^6$ .................................................. H02K 31/00

[52] U.S. Cl. .......................................... 310/178; 310/176

[58] Field of Search ..................................... 310/178, 176

[56] References Cited

U.S. PATENT DOCUMENTS

| | | | |
|---|---|---|---|
| 3,657,580 | 4/1972 | Doyle | 310/52 |
| 3,673,364 | 6/1972 | Klein | 200/16 |
| 4,271,369 | 6/1981 | Stillwagon | 310/178 |
| 4,499,392 | 2/1985 | Giacoletto | 310/178 |

*Primary Examiner*—Steven L. Stephan
*Assistant Examiner*—B. Mullins
*Attorney, Agent, or Firm*—John Forrest; Jacob Shuster

[57] ABSTRACT

The DC voltage of electrical energy applied to a homopolar machine, is converted by transformer windings in response to rotor rotation within the magnetic field of the homopolar machine, to a different voltage level for supply to a load.

7 Claims, 2 Drawing Sheets

HOMOPOLAR TRANSFORMER FOR CONVERSION OF ELECTRICAL ENERGY

The present invention relates to conversion of direct current (DC) voltage levels by transfer of electrical energy to and from rotating windings in the magnetic field of a homopolar machine.

BACKGROUND OF THE INVENTION

The construction and operation of homopolar machines for electric propulsion of marine vessels is already well known, as disclosed for example in U.S. Pat. No. 3,657,580 to Doyle. Such machines include motors and generators wherein electrical current flows through a conductor situated in a magnetic field during rotation of the machine rotor. In the case of a homopolar motor, the current will develop a force perpendicular to the direction of its flow through the conductor and that of the magnetic field. In the case of a homopolar generator, a voltage is induced in such conductor moving within the magnetic field. Armature voltage in the homopolar generator is proportional to speed, number of conductor turns and magnitude of the magnetic field, while in the case of a motor the rotor torque is proportional to current and number of conductor turns.

In connection with the supply of electrical energy from such homopolar machines for DC electric propulsion systems, aside from substantial equipment size and weight, voltage distortion and losses are presently involved in the use of solid state power conversion between different voltage levels. It is therefore an important object of the present invention to more cleanly and efficiently convert electrical energy from a high power DC voltage level to another level using a homopolar type of machine.

SUMMARY OF THE INVENTION

In accordance with the present invention, a DC transformer is associated with a homopolar machine having a rotor within an annular chamber of a stator housing. A separately generated magnetic field is directed through the stator and rotor. Individual windings on the rotor are connected to corresponding windings on the stator via slip rings. Multiple windings may thus be configured for electrical isolation from each other while situated in a common magnetic field. Terminals on the stator housing transmit power to one winding assembly, creating torque on the rotor. Such rotor torque is converted to current in a second winding assembly and conducted to an external load via additional terminals on the stator housing.

Pursuant to one embodiment of the invention, the transformer consists of a primary winding within which current flowing in the presence of a magnetic field induces a rotor torque which in turn produces a current in a second electrically isolated winding assembly in the same magnetic field. According to another embodiment, a single winding is associated with the transformer having a plurality of voltage taps connected to stator mounted terminals from which output voltages at different levels are transmitted to contacts of a selector switch for controlling the voltage ratio during supply to the load.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENTS

Figure 1:
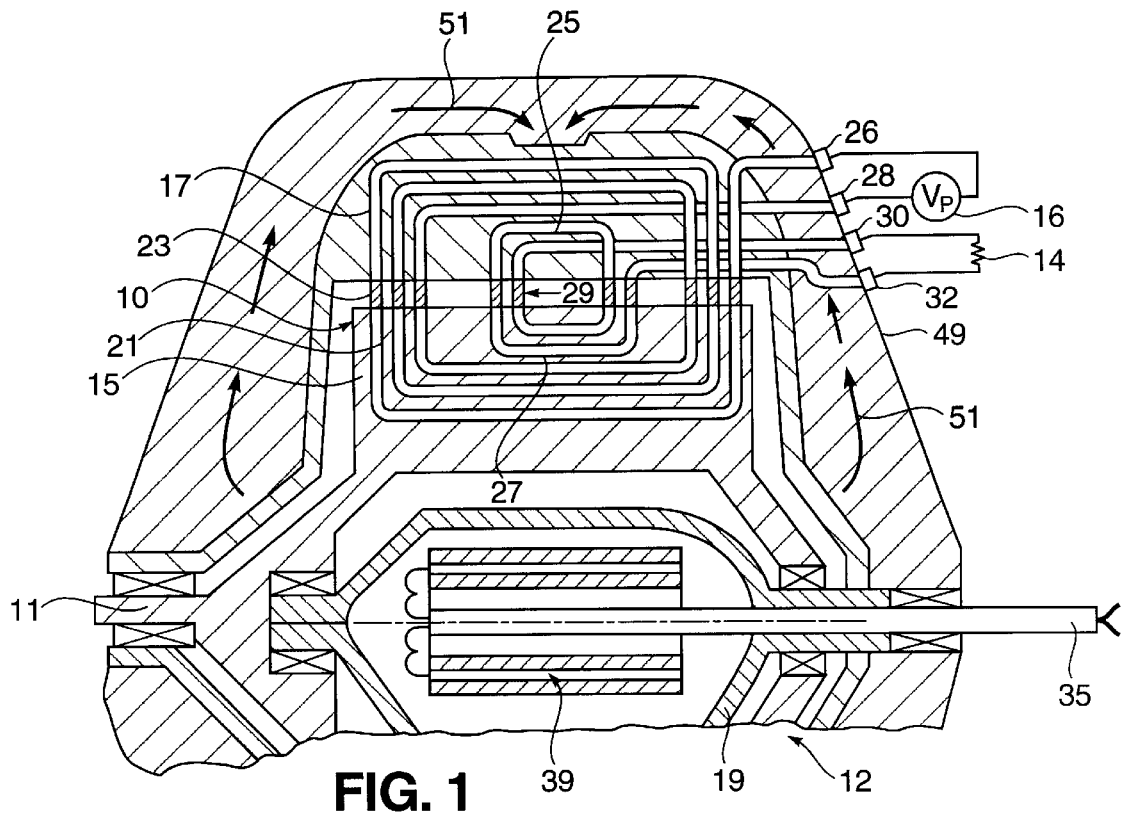
FIG. 1 is a partial section view through a homopolar machine with which the present invention is associated featuring a DC transformer constructed and arranged in accordance with one embodiment.

Referring now to the drawing in detail, FIG. 1 illustrates a direct current voltage transformer, generally referred to by reference numeral 10, incorporated within a homopolar machine 12 corresponding for example to the motor or generator disclosed in U.S. Pat. No. 3,657,580 to Doyle. The homopolar machine 12 as disclosed in the Doyle patent includes a rotor shaft 11 connected to a rotor housing 15 enclosing a stationary container 19 within which a magnetic field generating coil 39 is disposed to which direct current is conducted from some external source of electrical energy through a central conduit 35. As is generally known in the art, during acyclic operation of such a homopolar machine 12 a magnetic field is produced by the direct current energization of the coil 39. Such magnetic field is directed from the rotor housing 15 at opposite axial ends thereof by magnetic shielding elements 49 of the machine stator within which the DC voltage transformer 10 is disposed in accordance with the present invention. Such a homopolar machine also includes low resistance stator conductors 17 and rotor conductors 21 through which current may be conducted in series by means of slip ring brushes 23. The direction of the magnetic field flux directed by the elements 49, as indicated by arrows 51, is such as to direct flux across the stator conductors 17 as well as rotor conductors 21 in a direction orthogonal to the direction of conductor current flow. During operation of the homopolar machine 12 as a motor, a voltage source 16 connected to the stator terminals 26 and 28 causes a current to flow through the stator conductors 17 and rotor conductors 21, producing torque which rotates the rotor 15. Conversely, during operation of homopolar machine 12 as a generator, torque applied to the rotor shaft 11 rotates rotor 15 and rotor conductors 21 through the magnetic field flux in a direction mutually orthogonal to the field flux and the rotor conductor current direction, inducing a voltage at the generator terminals 30 and 32.

Figure 1A:
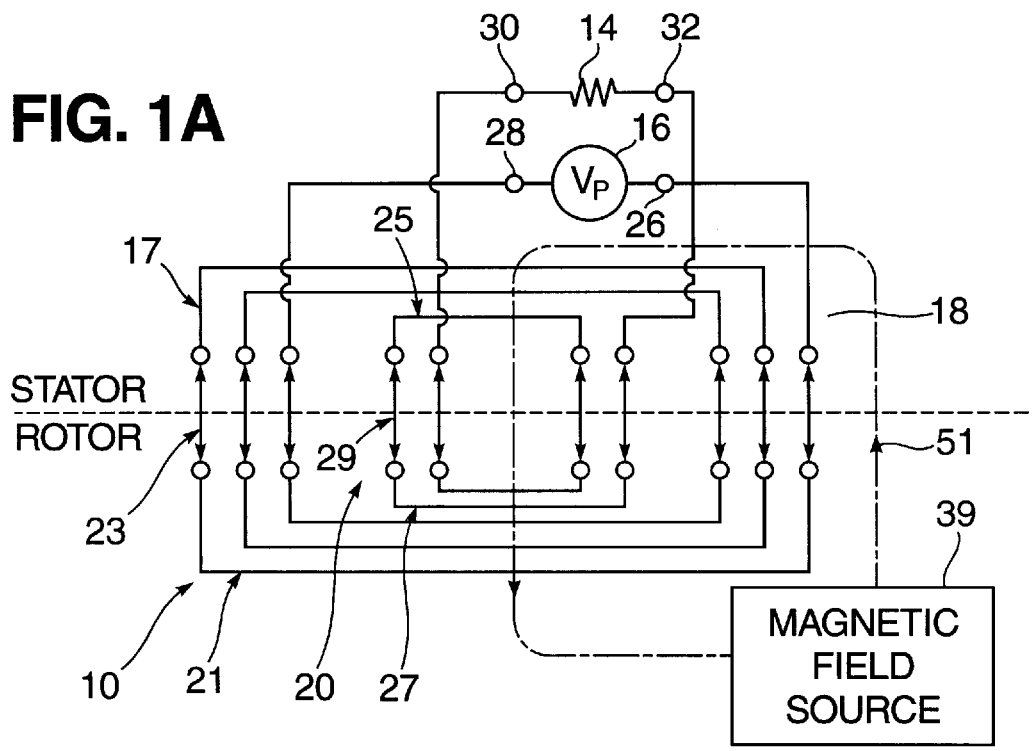
FIG. 1A is a schematic circuit diagram corresponding to the arrangement shown in FIG. 1.

The transformer 10 as diagrammed in FIG. 1A, includes a primary circuit 18 formed by the stator conductors 17, the rotor conductors 21 and brushes 23. A secondary circuit 20 is formed by stator conductor 25, rotor conductors 27 and brushes 29. Voltage applied from source 16 to the primary circuit induces torque in the rotor causing it to rotate. As the rotor moves through the magnetic field, current induced in the secondary circuit 20 is conducted from terminals 30 and 32 through load resistor 14, absorbing the torque through the primary circuit 18. Except for friction and windage losses, no net amount of mechanical torque is supplied to or removed from the machine 12. The basic homopolar machine relationships include machine speed proportional to voltage, number of winding turns, and magnetic field and motor torque proportional to current and number of turns. In addition to the primary circuit 18 having $N_p$ turns, the homopolar machine also contains the secondary circuit 20 of $N_s$ turns. The primary circuit Volts-per-turn are thus $V_p/N_p$, where $V_p$ is the primary voltage (ignoring losses). Since each turn moves at the same speed in the same magnetic field, the voltage induced in each turn, primary or secondary, is $V_p/N_p$. The secondary voltage, Vs, at output terminals 30, 32 is therefore $N_s(V_p/N_p)$, or $V_p(N_s/N_p)$. If the rotor shaft 11 is unloaded (i.e. the torque is zero, ignoring losses), then the sum of the currents in the windings of circuits 18 and 20 must also be zero. This equates to $N_p(I_p)=N_s(I_s)$. The equations are analogous to those of an AC transformer. Ohmic isolation between input voltage ($V_p$) and output voltage ($V_s$) is also provided by the foregoing described arrangement for the transformer.

Figure 2:
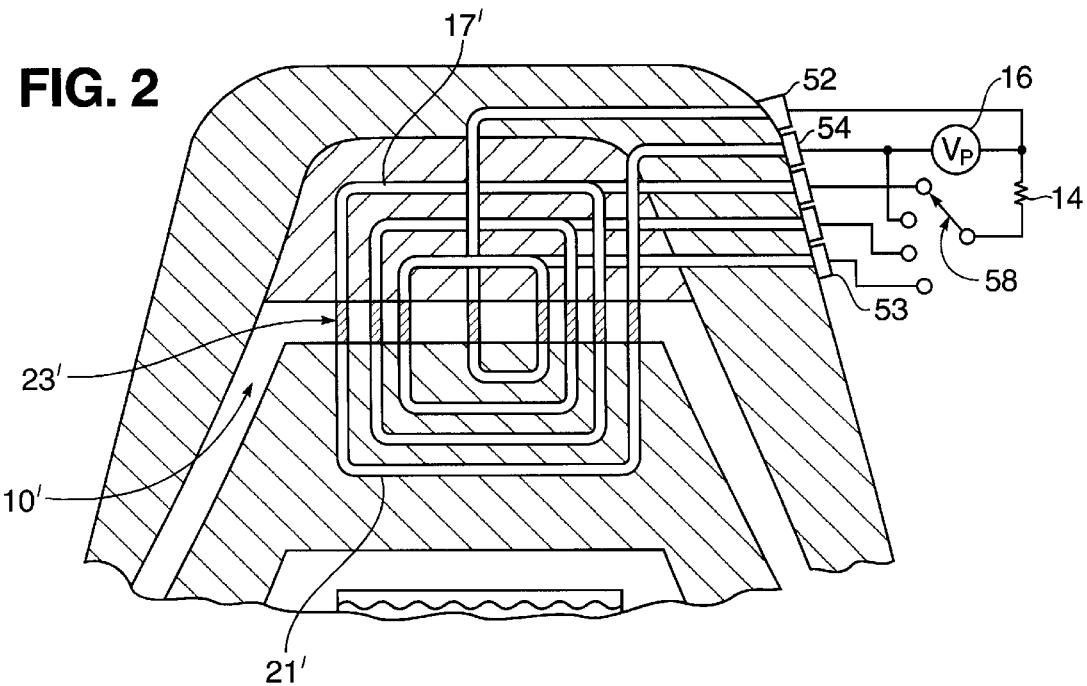
FIG. 2 is a partial section view corresponding to that of FIG. 1, showing an autotransformer in accordance with another embodiment of the invention.
Figure 2A:
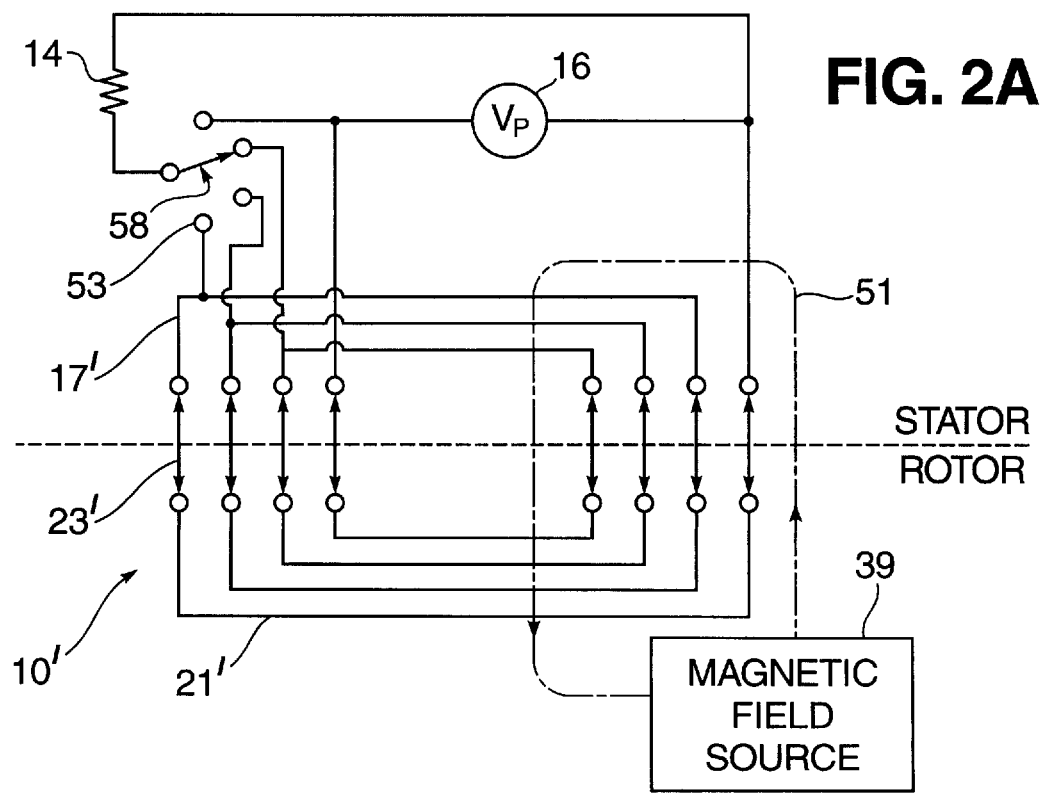
FIG. 2A is a schematic circuit diagram corresponding to the arrangement shown in FIG. 2.

If ohmic isolation between input and output transformer voltages is not required, then an autotransformer 10' as shown in FIG. 2 may replace the transformer 10. Such autotransformer 10' features a single circuit as also diagrammed in FIG. 2A formed by stator conductors 17', rotor conductors 21' and brushes 23', with the power source 16 connected between positive and negative terminals 52 and 54 through which current is conducted to the autotransformer 10', which is further provided with a plurality of taps 53 intermediate the ends thereof from which current is conducted to a switch 58 connected through load resistor 14' to the negative terminal 54. Such switch 58 may therefore be utilized to select the input/output ratio of autotransformer 10'. Also, input and output currents partially cancel in windings 17' and 21' to reduce losses.

In the embodiments hereinbefore described, rotation of the rotor of the homopolar machine 12 couples electrical energy through the transformer windings. It is however contemplated that some of such energy may be stored in the rotor during rotation so that the transformer may act as a flywheel for uninterruptible power supply covering intervals of loss of primary voltage from source 16.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a homopolar machine having a rotor within which a magnetic field is generated under a DC voltage and a stator from which a supply of electrical energy is provided; means directing said magnetic field from the rotor for extension through the stator; a transformer device for conversion of said electrical energy during said supply thereof, including: winding means mounted on the stator and the rotor within the magnetic field for performing said conversion of the electrical energy during rotation of the rotor relative to said magnetic field; and terminal means mounted on the stator for transmitting the electrical energy from the winding means after undergoing said conversion.

2. The combination as defined in claim 1 wherein said winding means of the transformer device includes: primary and secondary windings within which the electrical current is induced; said terminal means being operatively connected only to the secondary winding from which the supply of the electrical energy is transmitted at said voltage ratio after undergoing said conversion.

3. The combination as defined in claim 1 wherein said terminal means includes a plurality of voltage taps connected to the winding means; and switch means operatively connected to said voltage taps for selection of a voltage ratio at which the electrical energy is transmitted after undergoing said conversion.

4. In combination with means for generating a magnetic field under a DC voltage during rotation of a rotor relative to a stator, a transformer supplying electrical energy, including: means directing said magnetic field from the rotor for extension through the stator; winding means within the magnetic field in the rotor and the stator through which electrical current is inducedfor conversion of the electrical energy during rotation of the rotor; and terminal means mounted on said stator and operatively connected to the winding means for transmitting the electrical energy therefrom after undergoing said conversion.

5. The combination as defined in claim 4 wherein said winding means of the transformer includes: primary and secondary windings respectively mounted in the rotor and the stator; said terminal means being operatively connected only to the secondary winding from which the supply of the electrical energy is transmitted at a voltage ratio after undergoing said conversion.

6. An electromechanical conversion machine which comprises in combination: electrical conducting members rotating in a magnetic field generated by a direct current excited field coil; stator conducting members electrically connected to the rotating members so as to form therewith an electrical conducting transformer primary circuit; nonrotating magnetic shielding means positioned about said transformer primary circuit for directing the magnetic field through said rotating and stator conducting members; a transformer secondary circuit formed by the rotating and stator conducting members within the magnetic shielding means; and stator terminals joined to the stator conducting members of the primary and secondary transformer circuits through which DC voltage is transmitted.

7. The combination as defined in claim 6 including load resistor means connected to the stator conducting members for absorbing torque applied to the rotating conducting members through the transformer primary circuit.

* * * * *